(12) United States Patent
Hatano

(10) Patent No.: US 10,400,633 B2
(45) Date of Patent: Sep. 3, 2019

(54) PRESSURE VESSEL AND TURBINE

(71) Applicant: MITSUBISHI HEAVY INDUSTRIES, LTD., Tokyo (JP)

(72) Inventor: Kohei Hatano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 148 days.

(21) Appl. No.: 15/534,792

(22) PCT Filed: Aug. 26, 2015

(86) PCT No.: PCT/JP2015/074060
§ 371 (c)(1),
(2) Date: Jun. 9, 2017

(87) PCT Pub. No.: WO2016/098393
PCT Pub. Date: Jun. 23, 2016

(65) Prior Publication Data
US 2017/0342861 A1    Nov. 30, 2017

(30) Foreign Application Priority Data

Dec. 16, 2014 (JP) .................................. 2014-254453

(51) Int. Cl.
*F01D 25/24* (2006.01)
*F01D 25/26* (2006.01)
(Continued)

(52) U.S. Cl.
CPC ........... *F01D 25/265* (2013.01); *F01D 3/025* (2013.01); *F01D 11/18* (2013.01); *F01D 25/24* (2013.01);
(Continued)

(58) Field of Classification Search
CPC .......... F01D 11/18; F01D 25/24; F01D 3/025; F01D 25/265; F02C 7/00; F16J 12/00
See application file for complete search history.

(56) References Cited

U.S. PATENT DOCUMENTS 2,256,221 A * 9/1941 Smith .................... F01D 25/243
138/159
5,605,438 A * 2/1997 Burdgick .............. F01D 25/145
415/182.1
(Continued)

FOREIGN PATENT DOCUMENTS

JP   59-86753      5/1984
JP   2000-213305   8/2000
(Continued)

OTHER PUBLICATIONS

International Search Report dated Nov. 24, 2015 in corresponding International Application No. PCT/JP2015/074060.
(Continued)

*Primary Examiner* — Kevin A Lathers
(74) *Attorney, Agent, or Firm* — Wenderoth, Lind & Ponack, L.L.P.

(57) ABSTRACT

A pressure vessel for a turbine is disclosed. A cylindrical shape of the pressure vessel is divided into two parts in a radial direction of the pressure vessel and the pressure vessel is connected in the cylindrical shape via flanges protruding outward in the radial direction of the pressure vessel at both divided ends of the pressure vessel. Increased thickness portions are defined in a portion excluding the divided ends and circular arc center portions farthest from the divided ends. The portion is between the divided ends and the circular arc center portions and the increased thickness portions increase radial thickness of the portion.

5 Claims, 5 Drawing Sheets

(51) Int. Cl.
  *F02C 7/00* (2006.01)
  *F16J 12/00* (2006.01)
  *F01D 3/02* (2006.01)
  *F01D 11/18* (2006.01)

(52) U.S. Cl.
  CPC ............. *F02C 7/00* (2013.01); *F16J 12/00* (2013.01); *F05D 2220/31* (2013.01); *F05D 2260/30* (2013.01)

(56) References Cited

U.S. PATENT DOCUMENTS

| | | | |
|---|---|---|---|
| 6,336,789 B1 * | 1/2002 | Beerens | F01D 25/24 415/182.1 |
| 8,128,353 B2 * | 3/2012 | Flanagan | F01D 25/265 415/13 |
| 8,616,839 B2 | 12/2013 | Ballard, Jr. et al. | |
| 9,441,501 B2 | 9/2016 | Ballard, Jr. et al. | |
| 2010/0284792 A1 | 11/2010 | Ballard, Jr. et al. | |
| 2013/0236293 A1 | 9/2013 | Adaickalasamy | |

FOREIGN PATENT DOCUMENTS

| | | |
|---|---|---|
| JP | 2005-42612 | 2/2005 |
| JP | 4347977 | 10/2009 |
| JP | 2010-261450 | 11/2010 |
| JP | 2013-185593 | 9/2013 |

OTHER PUBLICATIONS

Written Opinion of the International Searching Authority dated Nov. 24, 2015 in corresponding International Application No. PCT/JP2015/074060 (with English translation).

* cited by examiner

PRESSURE VESSEL AND TURBINE

FIELD

The present invention relates to a pressure vessel, and to a turbine, to which the pressure vessel is applied.

BACKGROUND

Conventionally, for example, in U.S. Pat. No. 6,336,789, a casing of a steam turbine or a gas turbine has been disclosed. In this casing: flanges are provided at both ends thereof in a structure divided into two parts; a shell upper portion having a largely reinforced center portion is provided; and thickness of a lower portion of the shell at a position close to the flanges is kept thin; and thereby, during operation, deformation is caused in the lower portion only, whereas deformation in other parts thereof is made small.

Technical Problem

In a turbine, such as a steam turbine or a gas turbine: a pressure vessel forming a casing serving as an outer shell of the turbine is formed in a transversely placed cylinder shape, and is vertically divided into two parts; respective flanges thereof extending outward in a radial direction thereof at respective side portions thereof are fastened by bolts and the like; and a rotor, in which turbine blades are arranged around the rotor, is arranged at a center inside the turbine. When this turbine is in operation, that is: for a steam turbine, when steam is being supplied into the pressure vessel and the rotor is rotating; or for a gas turbine, when the rotor of the turbine is being rotated by combustion gas resulting from combustion, by a combustor, of air that has been compressed by a compressor; temperature and pressure inside the pressure vessel become high.

Since flange portions of the pressure vessel protrude from the side portions, thickness of the pressure vessel at the flange portions is thick. Thus, since at the flange portions, a thermal expansion difference between an inner surface side and an outer surface side thereof is large and force attempting to curve outward is large there as compared to the other part, the whole pressure vessel collapses at the right and left thereof and undergoes vertically long deformation vertically long.

When thickness of an upper portion and a lower portion is increased like in U.S. Pat. No. 6,336,789, in the upper portion and the lower portion, like in flange portions, a thermal expansion difference between an inner surface side and an outer surface side thereof is increased and a force attempting to curve outward is increased, and thus the vertically long deformation is prevented.

However, the turbine undergoes a phenomenon, in which a rotor thereof thermally expands in an axial direction, along which the rotor extends. In this case, the pressure vessel collapses at the top and the bottom thereof, and undergoes horizontally long deformation. This phenomenon tends to occur at end portions of the pressure vessel. Since the invention described in U.S. Pat. No. 6,336,789 is for preventing the vertically long deformation, as to the horizontally long deformation, the invention will function so as to cause more horizontally long deformation.

Such vertically long deformation and horizontally long deformation increase a gap between the turbine blades provided in the rotor and an inner peripheral surface of the casing in the turbine, and thus become a factor that reduces efficiency of the turbine.

SUMMARY

The present invention solves the above described problems, and an object thereof is to provide a pressure vessel and a turbine that enable vertically long deformation and horizontally long deformation thereof to be reduced and circularity thereof to be improved.

Solution to Problem

To achieve the above described object, in a pressure vessel according to the present invention, a cylindrical shape thereof is divided into two parts in a radial direction thereof, and the pressure vessel is connected in the cylindrical shape via flanges protruding outward in the radial direction at both divided ends thereof. Increased thickness portions that increase radial direction thickness thereof are formed in a portion excluding the divided ends and circular arc center portions farthest from the divided ends, the portion being between the divided ends and the circular arc center portions.

According to this pressure vessel, with respect to the form, in which, due to the circumferential direction thermal expansion difference, the circular arc center portions are deformed outward in the radial direction and both the divided ends connected via the flanges are deformed inward in the radial direction; by the function for reduction of the amounts of curvature of both the divided ends through the thermal expansion difference between the inner peripheral surface and the outer peripheral surface of the portion where the increased thickness portions have been provided, and by reduction of the deformation of the circular arc center portions outward in the radial direction through the balance between the amounts of curvature in the respective increased thickness portions symmetrically positioned with reference to the circular arc center portions, the circularity is maintained. With respect to the form, in which, due to the center axis direction thermal expansion difference, both the divided ends connected via the flanges are deformed outward in the radial direction and the circular arc center portions are deformed inward in the radial direction; by the function for reduction of the amounts of curvature of the circular arc center portions through the thermal expansion difference between the inner peripheral surface and the outer peripheral surface of the portion where the increased thickness portions have been provided, and by reduction of the deformation of both the divided ends outward in the radial direction through the balance between the amounts of curvature in the respective increased thickness portions symmetrically positioned with reference to both the divided ends, the circularity is maintained. As a result, the circularity is able to be improved.

Further, in the pressure vessel according to the present invention, the increased thickness portions are provided symmetrically with reference to center positions between the divided ends and the circular arc center portions.

According to this pressure vessel, by the increased thickness portions being arranged at symmetrical positions of the cylindrical shape, the balance among the amounts of curvature due to the thermal expansion differences in the respective increased thickness portions is achieved well, and the effect of improving the circularity is able to be obtained prominently.

Further, in the pressure vessel according to the present invention, the increased thickness portions are provided such that thickness of both end portions thereof is gradually increased toward center positions between the divided ends and the circular arc center portions.

According to this pressure vessel, by the amounts of curvature due to the thermal expansion differences in the respective increased thickness portions being gradually increased toward the center positions, the situation where extreme differences among the amounts of curvature are caused is prevented, and thus the effect of improving the circularity is able to be obtained prominently.

Further, in the pressure vessel according to the present invention, the increased thickness portions are provided continuously along a center axis direction of the cylindrical shape.

According to this pressure vessel, the effect of improving the circularity is able to be obtained continuously along the center axis direction of the cylindrical shape.

To achieve the above described object, in a turbine according to the present invention, a rotor is rotatably provided inside a casing. Any one of the above described pressure vessels is applied to the casing.

According to this turbine, with respect to the form, in which, due to the circumferential direction thermal expansion difference, the circular arc center portions are deformed outward in the radial direction and both the divided ends connected via the flanges are deformed inward in the radial direction; by the function for reduction of the amounts of curvature of both the divided ends through the thermal expansion difference between the inner peripheral surface and the outer peripheral surface in the portion where the increased thickness portions have been provided, and by reduction of the deformation of the circular arc center portions outward in the radial direction through the balance between the amounts of curvature in the respective increased thickness portions symmetrically positioned with reference to the circular arc center portions, the circularity is maintained. With respect to the form, in which, due to the center axis direction thermal expansion difference, both the divided ends connected via the flanges are deformed outward in the radial direction and the circular arc center portions are deformed inward in the radial direction; by the function for reduction of the amounts of curvature of the circular arc center portions through the thermal expansion difference between the inner peripheral surface and the outer peripheral surface of the portion where the increased thickness portions have been provided, and by reduction of the deformation of both the divided ends outward in the radial direction through the balance between the amounts of curvature in the respective increased thickness portions symmetrically positioned with reference to both the divided ends, the circularity is maintained. As a result, the circularity is able to be improved. By the improvement of the circularity, the situation where the gap between the turbine blades provided in the rotor and the inner peripheral surface of the casing is increased is able to be prevented, and the efficiency of the turbine is able to be improved.

Advantageous Effects of Invention

According to the present invention, circularity is able to be improved.

DESCRIPTION OF EMBODIMENTS

Hereinafter, an embodiment according to the present invention will be described in detail, based on the drawings. The present invention is not limited by this embodiment. Further, components in the embodiment described below include any component easily substitutable by those skilled in the art or any component substantially identical thereto.

Figure 1:
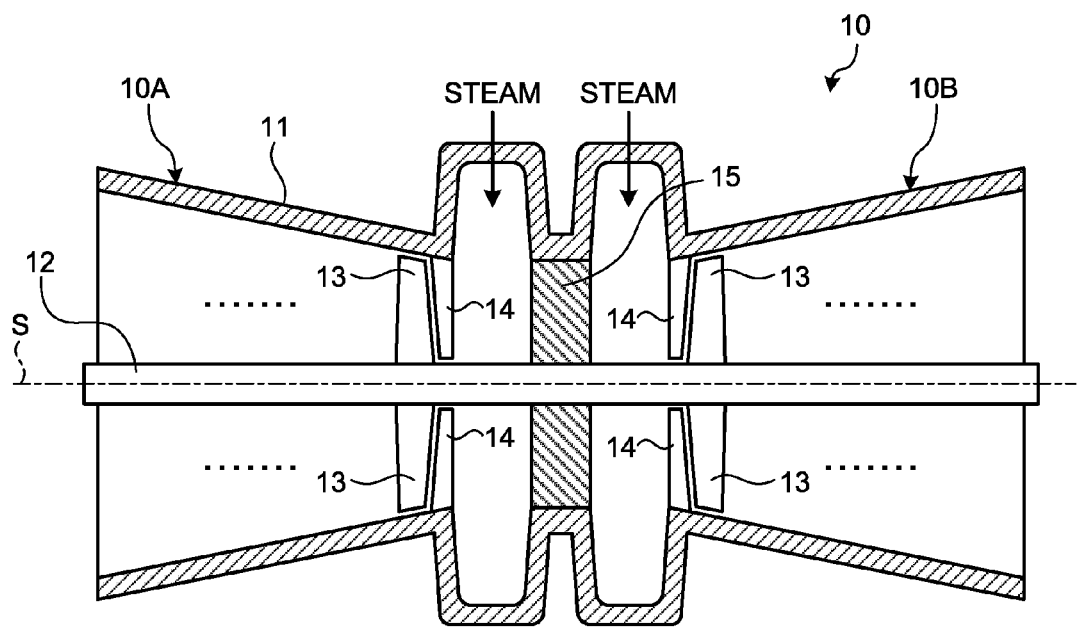
FIG. 1 is a schematic cross sectional view of a turbine, to which a pressure vessel according to an embodiment of the present invention is applied.
Figure 2:
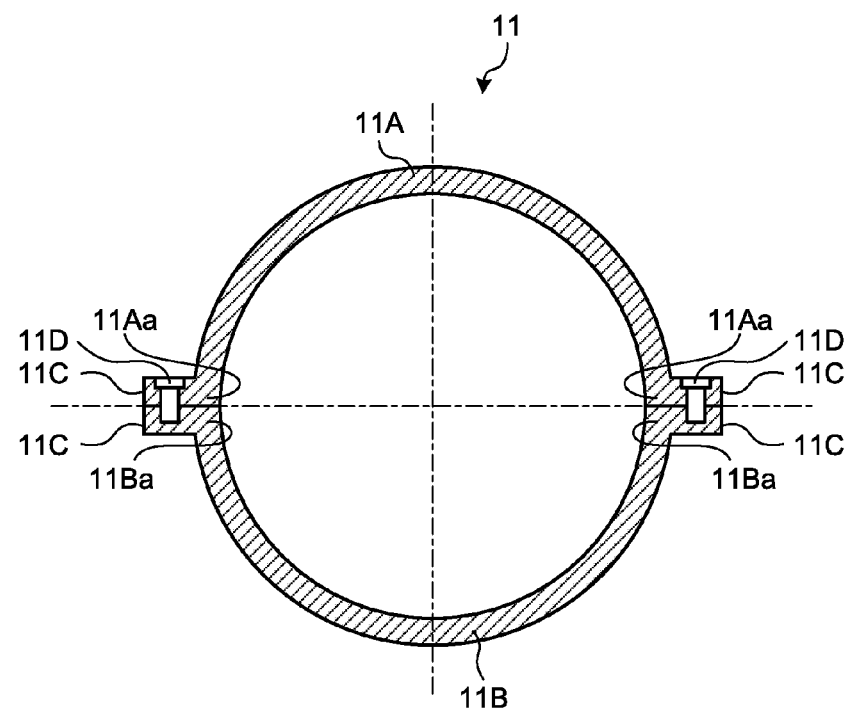
FIG. 2 is a cross sectional view of a casing in the turbine, to which the pressure vessel according to the embodiment of the present invention is applied.

FIG. 1 is a schematic cross sectional view of a turbine, to which a pressure vessel according to the embodiment is applied. FIG. 2 is a cross sectional view of a casing in the turbine, to which the pressure vessel according to this embodiment is applied.

The turbine illustrated in FIG. 1 exemplifies a steam turbine 10. The steam turbine 10 has a casing 11 and a rotor 12. The casing 11 is the pressure vessel of this embodiment, and is formed in a cylindrical shape. This casing 11 is divided into two parts in a radial direction, as illustrated in FIG. 2, and flanges 11C protruding outward in the radial direction are provided at divided ends 11Aa and 11Ba of both divided casings 11A and 11B. The flanges 11C at a divided casing 11A side and a divided casing 11B side are abutted against each other, and are connected to each other, for example, by fastening with a bolt 11D. By the connection between these flanges 11C, the casing 11 is formed in the cylindrical shape with both of the divided casings 11A and 11B. Since the rotor 12 is hung by a crane when the rotor 12 is taken into and out from the casing 11, the casing 11 is normally configured to be vertically divided into the divided casings 11A and 11B such that an upper half portion thereof is able to made open. Further, the flanges 11C are formed continuously along a center axis direction, which is an extending direction of a center axis S of the cylindrical shape.

The rotor 12 is arranged inside the casing 11. A shaft center of the rotor 12 is arranged on the center axis S of the cylindrical shape of the casing 11, and is provided to be rotatable around the shaft center. Further, the rotor 12 has plural turbine blades 13 extending out in a radial direction of the cylindrical shape and arranged in a circumferential direction toward an inner peripheral surface of the casing 11. At a casing 11 side, plural turbine vanes 14 forming counterparts of the turbine blades 13 extend out from the inner peripheral surface toward the rotor 12, and are arranged in the circumferential direction.

The steam turbine 10 illustrated in FIG. 1 illustrates, as an example, a structure, in which steam is supplied from the center axis direction center of the casing 11 and steam is respectively supplied to both sides separated at the center of the rotor 12 via a seal portion 15. That is, the steam turbine 10 illustrated in FIG. 1 is integrally formed of a first turbine 10A and a second turbine 10B for the single casing 11 and the single rotor 12. In each of the turbines 10A and 10B, motive power is obtained by the turbine blades 13 rotating the rotor 12 by passage of the steam supplied to the casing 11, the passage being between the turbine blades 13 and the turbine vanes 14, and power generation is performed by, for example, a generator (illustration thereof being omitted) connected to the rotor 12.

Further, the turbine may be, although not clearly illustrated in the drawings, a gas turbine. The gas turbine also has a casing and a rotor, the casing is the pressure vessel of this embodiment, a cylindrical shape thereof is divided into two parts in a radial direction thereof, flanges protruding outward in the radial direction are provided at divided ends of both of divided casings, and the casing is formed in the cylindrical shape with both the divided casings by connection between these flanges.

Figure 3:
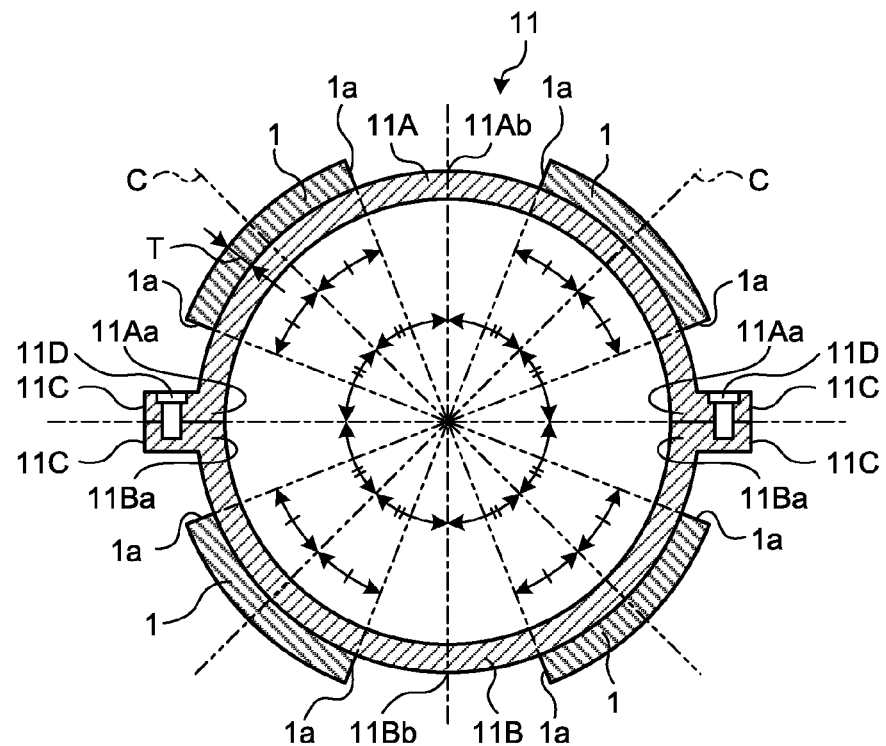
FIG. 3 is a cross sectional view of the pressure vessel according to the embodiment of the present invention.
Figure 4:
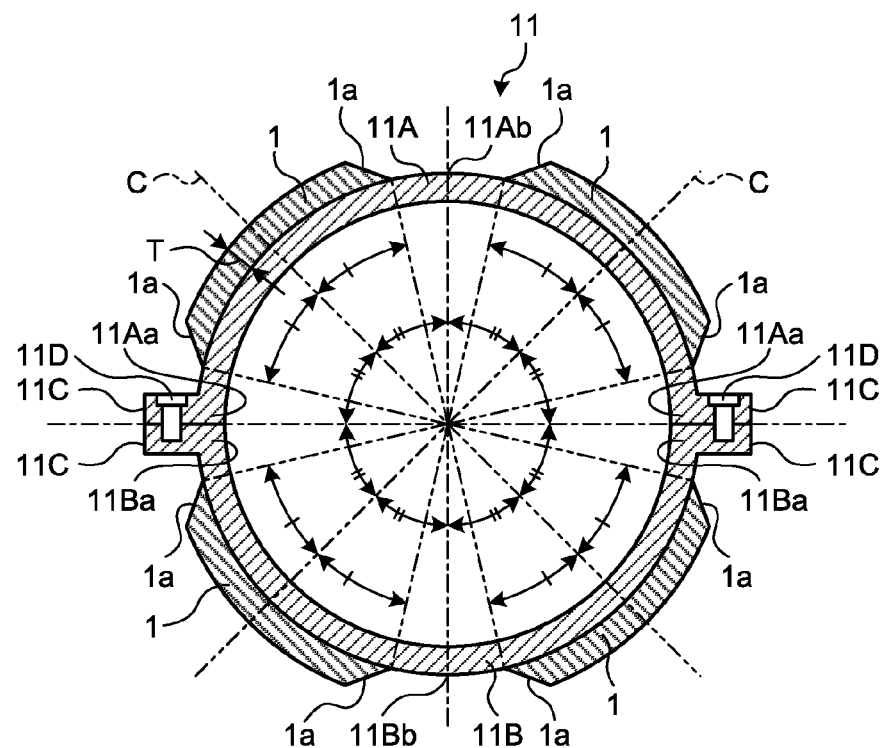
FIG. 4 is a cross sectional view of the pressure vessel according to the embodiment of the present invention.

FIG. 3 and FIG. 4 are cross sectional views of the pressure vessel according to the embodiment.

The above described casing 11 has increased thickness portions 1 formed therein. The increased thickness portions 1 are provided in a portion excluding: the divided ends 11Aa and 11Ba of the divided casings 11A and 11B in which the flanges 11C are provided; and circular arc center portions 11Ab and 11Bb farthest from the divided ends 11Aa and 11Ba; the portion being between the divided ends 11Aa and 11Ba and circular arc center portions 11Ab and 11Bb, and are provided outward in the radial direction of the casing 11 so as to increase radial direction thickness of that portion. These increased thickness portions 1 may be the same as, or different from a material forming the casing 11.

Further, the increased thickness portions 1 are provided symmetrically to each other with reference to center positions C between the divided ends 11Aa and 11Ba and the circular arc center portions 11Ab and 11Bb. The casing 11 has the cylindrical shape, and the divided casings 11A and 11B divide the cylindrical shape into two parts and are divided at 180°. Angles between the divided ends 11Aa and 11Ba of the divided casings 11A and 11B and the circular arc center portions 11Ab and 11Bb are 90°, and the center positions C therebetween are at 45° positions. The increased thickness portions 1 are formed such that lengths thereof from the center positions C at these 45° positions to respective end portions 1a thereof at divided end 11Aa and 11Ba sides and at circular arc center portion 11Ab and 11Bb sides are equal to each other.

Further, the increased thickness portions 1 are formed such that radial direction thickness T thereof from the center positions C to the respective end portions 1A is uniform. Furthermore, the increased thickness portions 1 are provided at two positions symmetrical to each other with reference to the circular arc center portion 11Ab or 11Bb of the divided casing 11A or 11B, and are provided at four equal positions in the cylindrical shape of the casing 11.

Further, the increased thickness portion 1 is provided, as illustrated in FIG. 4, such that both of the end portions 1a thereof gradually increase in thickness toward the center position C. As illustrated in FIG. 4, the increased thickness portion 1 is formed such that the radial direction thickness T thereof is uniform excluding the respective end portions 1a. Or, although not illustrated clearly in the drawings, the increased thickness portion 1 may be provided such that thickness thereof is gradually increased from both of the end portions 1a thereof to the center position C, and formed such that the increased thickness portion 1 becomes the thickest at the center position C.

These increased thickness portions 1 are provided continuously along the center axis direction of the cylindrical shape of the casing 11.

Figure 5:
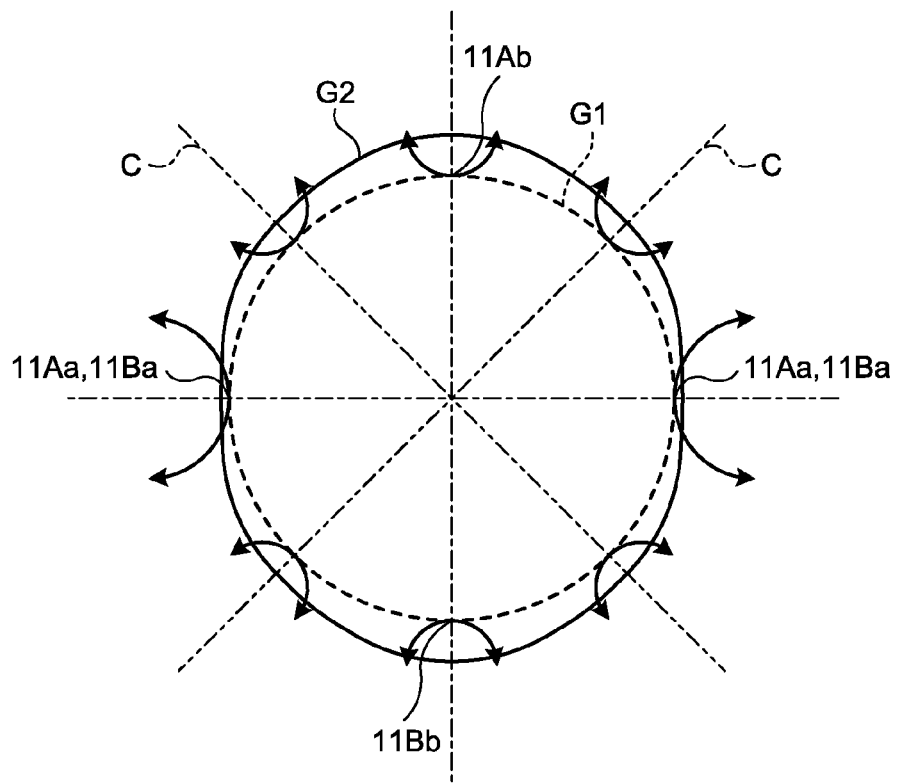
FIG. 5 is a diagram illustrating functions of a pressure vessel, to which the embodiment of the present invention has not been applied.
Figure 6:
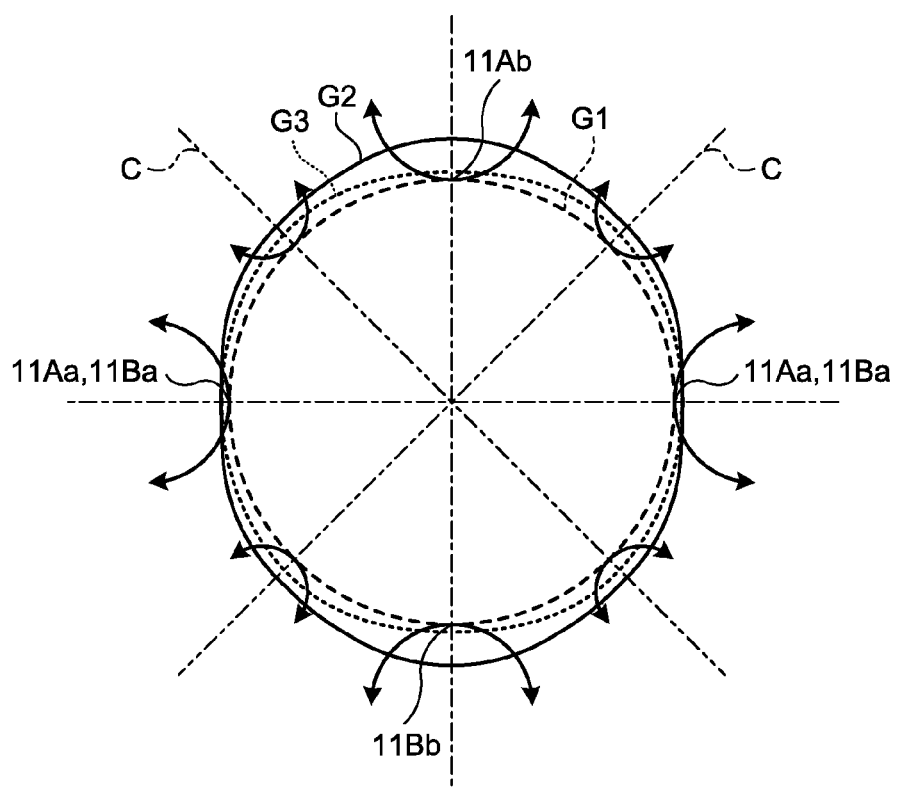
FIG. 6 is a diagram illustrating functions of a pressure vessel of a comparative example.
Figure 7:
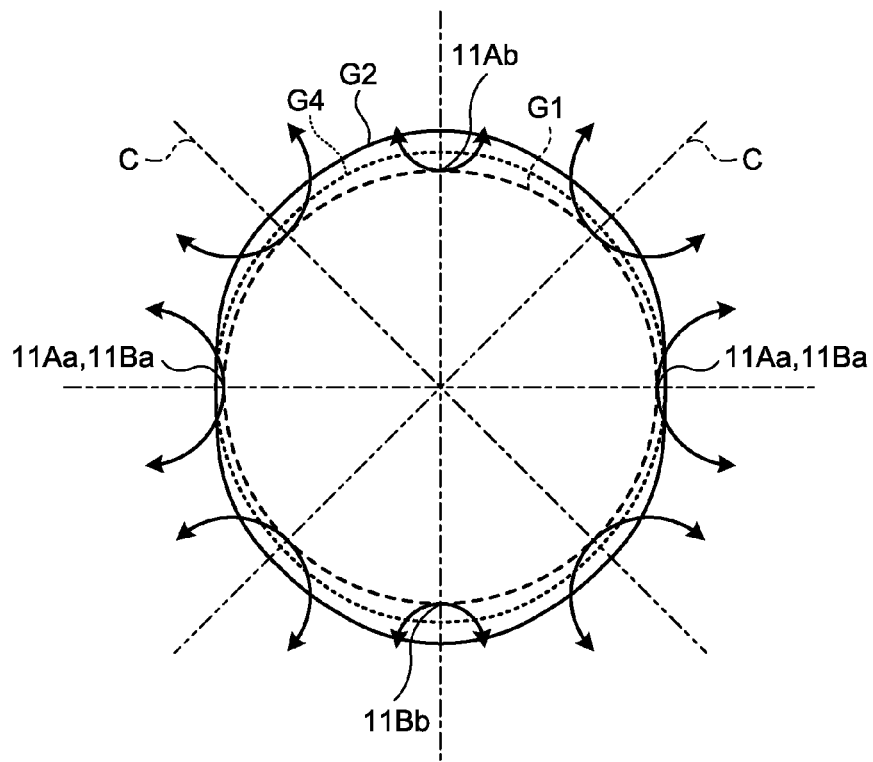
FIG. 7 is a diagram illustrating functions of the pressure vessel according to the embodiment of the present invention.

Hereinafter, functions of the increased thickness portions 1 will be described. First, vertically long deformation will be described. FIG. 5 is a diagram illustrating functions of a pressure vessel, to which this embodiment has not been applied. FIG. 6 is a diagram illustrating functions of a pressure vessel of a comparative example. FIG. 7 is a diagram illustrating functions of the pressure vessel according to the embodiment of the present invention.

FIG. 5 to FIG. 7 each illustrate a case where vertically long deformation is caused in the casing 11. As illustrated in FIG. 5, normally, the casing 11 is perfectly circular as illustrated with a broken line G1, and upon operation, by supply of high temperature fluid into the casing 11, temperature of the inner peripheral surface thereof is increased and a temperature difference between the inner peripheral surface and an outer peripheral surface thereof is caused. When the temperature difference is caused, without the flanges 11C, since the amounts of curvature, in which outward curvature is caused by a thermal expansion difference, become equal in the circumferential direction; due to the balance being kept among the amounts of curvature, although deformation is caused outward in the radial direction, the circularity is maintained.

However, since the casing 11 is divided into the divided casings 11A and 11B and these are formed into the cylindrical shape, the flanges 11C protruding outward in the radial direction are provided at the divided ends 11Aa and 11Ba. When the flanges 11C protruding outward in the radial direction are provided like this, if a temperature difference between the inner peripheral surface and the outer peripheral surface is caused due to the increase in temperature of the inner peripheral surface, because the thickness between the inner peripheral surface and the outer peripheral surface of the portion at the flanges 11C is large, the thermal expansion difference is increased, and the amount of curvature there, in which outward curvature is caused, becomes larger than that in the other part. Therefore, the balance among the amounts of curvature is lost, and the portion at the divided ends 11Aa and 11Ba connected via the flanges 11C attempts to curve outward largely, and thus vertically long deformation is caused as illustrated with a solid line G2 due to the thermal expansion difference in the circumferential direction.

In a case where, for example, the thickness of the circular arc center portions 11Ab and 11Bb of the divided casings 11A and 11B is increased as described in U.S. Pat. No. 6,336,789 against such vertically long deformation illustrated in FIG. 5, the case being the comparative example illustrated in FIG. 6, since the thickness between the inner peripheral surface and the outer peripheral surface of the circular arc center portions 11Ab and 11Bb is large, it will be assumed that the thermal expansion difference is increased, and the amount of curvature there, in which outward curvature is caused, becomes equal to that of the portions at the flanges 11C. Since the amounts of curvature in the circular arc center portions 11Ab and 11Bb and in the portion at the flasnges 11C balance each other, the circularity is maintained although vertically long deformation is caused outward in the radial direction as illustrated with a thin broken line G3.

Meanwhile, in the pressure vessel of this embodiment illustrated in FIG. 7, the increased thickness portions 1 are provided at the center positions C. Therefore, since the thickness between the inner peripheral surfaces and the outer peripheral surfaces at the center positions C is large, the thermal expansion difference is increased, and the amounts of curvature there, in which outward curvature is caused, become nearly equal to that of the portion at the flanges 11C. Due to the curvature at the center positions C, the amount of curvature of the portion at the flanges 11C is reduced, and the amounts of curvature at the respective increased thickness portions 1 symmetrically positioned to each other with reference to the circular arc center portions 11Ab and 11Bb balance each other in the respective divided casings 11A and 11B, and thus deformation of the circular arc center portions 11Ab and 11Bb outward in the radial direction is reduced. Accordingly, due to functions different from those of the comparative example, the circularity is maintained although vertically long deformation is caused outward in the radial direction as illustrated with a thin broken line G4.

Figure 8:
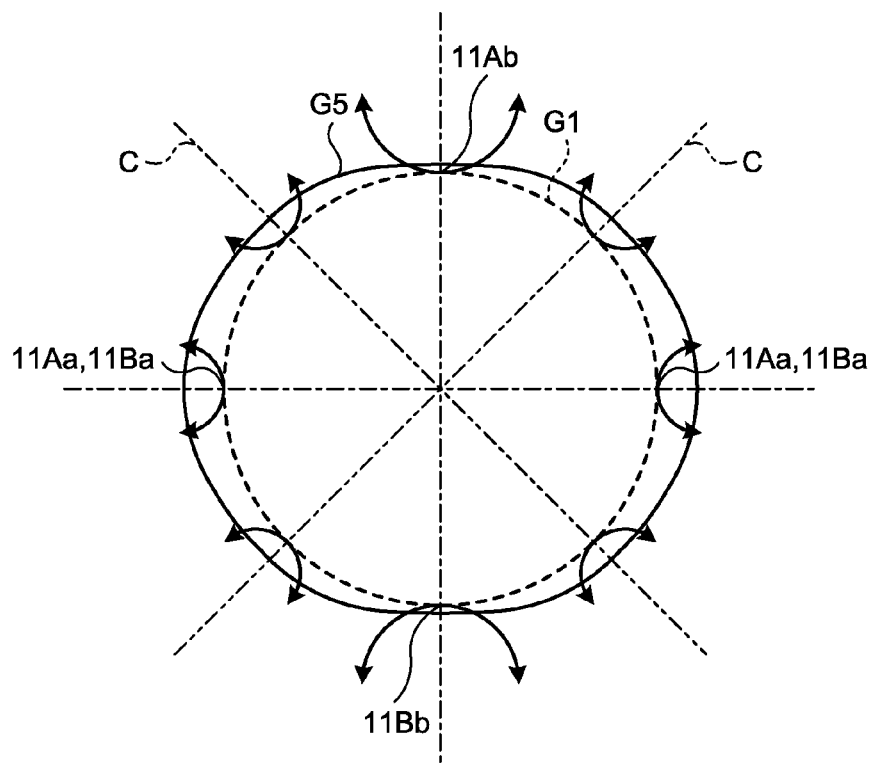
FIG. 8 is a diagram illustrating functions of a pressure vessel, to which the embodiment of the present invention has not been applied.
Figure 9:
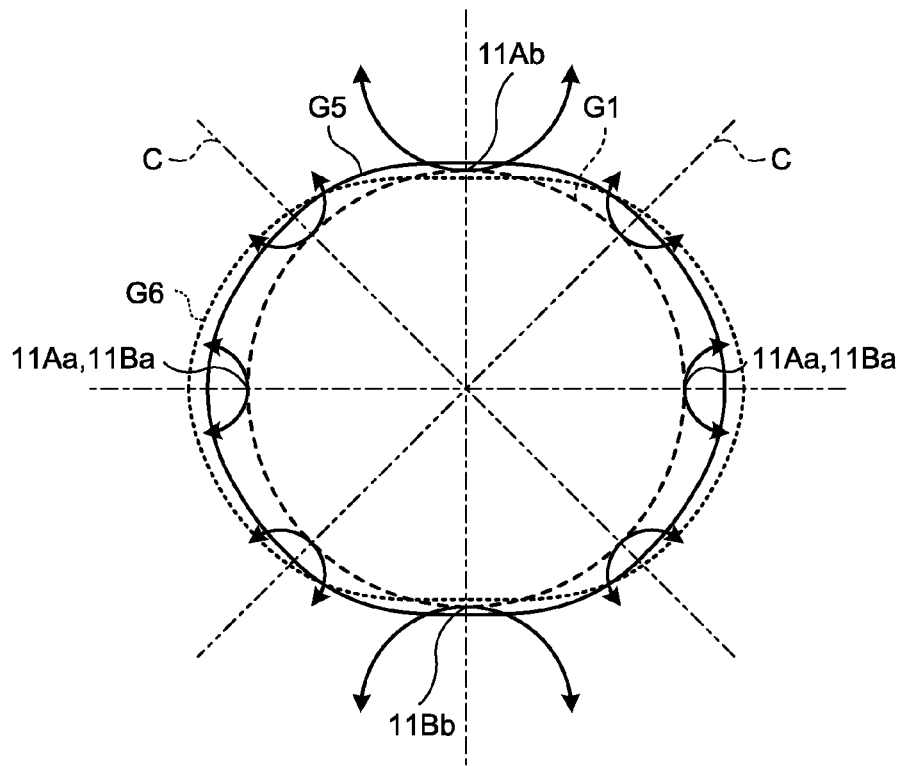
FIG. 9 is a diagram illustrating functions of a pressure vessel of a comparative example.
Figure 10:
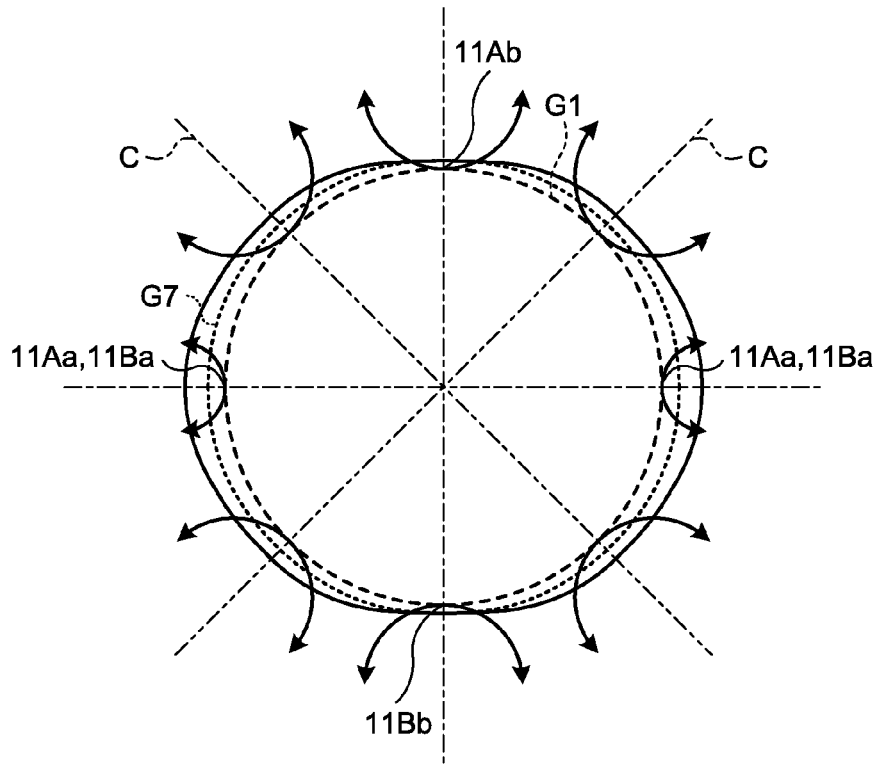
FIG. 10 is a diagram illustrating functions of the pressure vessel according to the embodiment of the present invention.

Next, horizontally long deformation will be described. FIG. 8 is a diagram illustrating functions of a pressure vessel, to which this embodiment has not been applied. FIG. 9 is a diagram illustrating functions of a pressure vessel of a comparative example. FIG. 10 is a diagram illustrating functions of the pressure vessel according to this embodiment.

FIG. 8 to FIG. 10 each illustrate a case where horizontally long deformation is caused in the casing 11. As illustrated in FIG. 8, normally, the casing 11 is perfectly circular as illustrated with the broken line G1. When thermal expansion occurs in the center axis direction of the cylindrical shape, the amounts of outward curvature in the circular arc center portions 11Ab and 11Bb of the respective divided casings 11A and 11B become larger than that in the other part, and due to the thermal expansion difference in the center axis direction, vertical collapse occurs and horizontally long deformation long in the horizontal direction is caused as illustrated with a solid line G5.

In a case where, for example, the thickness of the circular arc center portions 11Ab and 11Bb of the divided casings 11A and 11B is increased as described in U.S. Pat. No. 6,336,789 against such horizontally long deformation illustrated in FIG. 8, the case being the comparative example illustrated in FIG. 9, since the thickness between the inner peripheral surface and the outer peripheral surface of the circular arc center portions 11Ab and 11Bb is large, the thermal expansion difference is increased, and the amounts of curvature there, in which outward curvature is caused, become even larger as compared to that of the other part. Accordingly, the horizontally long deformation is increased as illustrated with a thin broken line G6.

Meanwhile, in the pressure vessel of this embodiment illustrated in FIG. 10, the increased thickness portions 1 are provided at the center positions C. Therefore, since the thickness between the inner peripheral surfaces and the outer peripheral surfaces at the center positions C is large, the thermal expansion difference is increased, and the amounts of curvature there, in which outward curvature is caused, become nearly equal to that of the circular arc center portions 11Ab and 11Bb. Since the amounts of curvature of the circular arc center portions 11Ab and 11Bb are reduced by the curvature at the center positions C, and the amounts of curvature in the respective increased thickness portions 1 symmetrically positioned with reference to the divided ends 11Aa and 11Ba connected via the flanges 11C balance each other between the divided casings 11A and 11B, the defor- mation of the divided ends 11Aa and 11Ba outward in the radial direction is reduced. Accordingly, the circularity is maintained although horizontally long deformation is caused outward in the radial direction as illustrated with a thin broken line G7.

As described above, according to the casing (pressure vessel) 11 of this embodiment, in the casing 11, in which the cylindrical shape thereof is divided into two parts in the radial direction, and which is connected in the cylindrical shape via the flanges 11C protruding outward in the radial direction at both of the divided ends 11Aa and 11Ba, the increased thickness portions 1 are formed in the portion excluding the divided ends 11Aa and 11Ba and the circular arc center portions 11Ab and 11Bb farthest from the divided ends 11Aa and 11Ba, the portion being between the divided ends 11Aa and 11Ba and the circular arc center portions 11Ab and 11Bb, the increased thickness portions 1 increasing the thickness thereof in the radial direction.

According to this casing 11, with respect to the form, in which, due to the circumferential direction thermal expansion difference, the circular arc center portions 11Ab and 11Bb are deformed outward in the radial direction and both the divided ends 11Aa and 11Ba connected via the flanges 11C are deformed inward in the radial direction; by the function for reduction of the amounts of curvature of both the divided ends 11Aa and 11Ba through the thermal expansion difference between the inner peripheral surface and the outer peripheral surface of the portion where the increased thickness portions 1 have been provided, and by reduction of the deformation of the circular arc center portions 11Ab and 11Bb outward in the radial direction through the balance between the amounts of curvature in the respective increased thickness portions 1 symmetrically positioned with reference to the circular arc center portions 11Ab and 11Bb, the circularity is maintained. with respect to the form in which, due to the center axis direction thermal expansion difference, both the divided ends 11Aa and 11Ba connected via the flanges 11C are deformed outward in the radial direction and the circular arc center portions 11Ab and 11Bb are deformed inward in the radial direction; by the function for reduction of the amounts of curvature of the circular arc center portions 11Ab and 11Bb through the thermal expansion difference between the inner peripheral surface and the outer peripheral surface of the portion where the increased thickness portions 1 have been provided, and by reduction of the deformation of both the divided ends 11Aa and 11Ba outward in the radial direction through the balance between the amounts of curvature in the respective increased thickness portions 1 symmetrically positioned with reference to both the divided ends 11Aa and 11Ba, the circularity is maintained. As a result, the circularity is able to be improved.

Further, in the casing 11 of this embodiment, the increased thickness portions 1 are provided symmetrically with reference to the center positions C between the divided ends 11Aa and 11Ba and the circular arc center portions 11Ab and 11Bb.

According to this casing 11, by the increased thickness portions 1 being arranged at symmetrical positions of the cylindrical shape, the balance among the amounts of curvature due to the thermal expansion differences in the respective increased thickness portions 1 is achieved, and thus the effect of improving the circularity is able to be obtained prominently.

Further, in the casing 11 of this embodiment, the increased thickness portions 1 are provided such that the thickness of both the end portions 1a thereof is gradually increased toward the center positions C between the divided ends 11Aa and 11Ba and the circular arc center portions 11Ab and 11Bb.

According to this casing 11, by the amounts of curvature due to the thermal expansion differences in the respective increased thickness portions 1 being gradually increased toward the center positions C, the situation where extreme differences among the amounts of curvature are caused is prevented, and thus the effect of improving the circularity is able to be obtained prominently.

Further, in the casing 11 of this embodiment, the increased thickness portions 1 are provided continuously along the center axis direction of the cylindrical shape.

According to this casing 11, the effect of improving the circularity is able to be obtained continuously along the center axis direction of the cylindrical shape.

Further, according to the steam turbine (turbine) 10 of this embodiment, the above described casing 11 is applied to the steam turbine 10, in which the rotor 12 is rotatably provided inside the casing 11.

According to this steam turbine 10, with respect to the form, in which, due to the circumferential direction thermal expansion difference, the circular arc center portions 11Ab and 11Bb are deformed outward in the radial direction and both the divided ends 11Aa and 11Ba connected via the flanges 11C are deformed inward in the radial direction; by the function for reduction of the amounts of curvature of both the divided ends 11Aa and 11Ba through the thermal expansion difference between the inner peripheral surface and the outer peripheral surface of the portion where the increased thickness portions 1 have been provided, and by reduction of the deformation of the circular arc center portions 11Ab and 11Bb outward in the radial direction through the balance between the amounts of curvature in the respective increased thickness portions 1 symmetrically positioned with reference to the circular arc center portions 11Ab and 11Bb, the circularity is maintained. Meanwhile, with respect to the form, in which, due to the center axis direction thermal expansion difference, both the divided ends 11Aa and 11Ba connected via the flanges 11C are deformed outward in the radial direction and the circular arc center portions 11Ab and 11Bb are deformed inward in the radial direction; by the function for reduction of the amounts of curvature of the circular arc center portions 11Ab and 11Bb through the thermal expansion difference between the inner peripheral surface and the outer peripheral surface of the portion where the increased thickness portions 1 have been provided, and by reduction of the deformation of both the divided ends 11Aa and 11Ba outward in the radial direction through the balance between the amounts of curvature in the respective increased thickness portions 1 symmetrically positioned with reference to both the divided ends 11Aa and 11Ba, the circularity is maintained. As a result, the circularity is able to be improved. By the improvement of the circularity, the situation where the gap between the turbine blades 13 provided in the rotor 12 and the inner peripheral surface of the casing 11 is increased is able to be prevented, and the efficiency of the turbine is able to be improved.

REFERENCE SIGNS LIST

1 INCREASED THICKNESS PORTION
1a END PORTION
10, 10A, 10B STEAM TURBINE (TURBINE)
11 CASING (PRESSURE VESSEL)
11A, 11B DIVIDED CASING
11Aa, 11Ba DIVIDED END
11Ab, 11Bb CENTER PORTION
11C FLANGE
11D BOLT
12 ROTOR
13 TURBINE BLADE
14 TURBINE VANE
15 SEAL PORTION
C CENTER POSITION
S CENTER AXIS

The invention claimed is:

1. A pressure vessel for a turbine, in which a cylindrical shape of the pressure vessel is divided into two parts in a radial direction of the pressure vessel, and the pressure vessel is connected in the cylindrical shape via flanges protruding outward in the radial direction of the pressure vessel at both divided ends of the pressure vessel,
wherein:
increased thickness portions are defined in a portion excluding the divided ends and circular arc center portions farthest from the divided ends, the portion being between the divided ends and the circular arc center portions;
the increased thickness portions increase radial direction thickness of the portion; and
each of the increased thickness portions has: (i) a first circumferential surface facing toward the pressure vessel and being parallel to the pressure vessel; (ii) a second circumferential surface facing away from the pressure vessel and being parallel to the pressure vessel; (iii) a first side surface; and (iv) a second side surface.

2. The pressure vessel according to claim 1, wherein the increased thickness portions are symmetrical with reference to center positions between the divided ends and the circular arc center portions.

3. The pressure vessel according to claim 1, wherein thickness of both end portions of each of the increased thickness portions is increased toward center positions between the divided ends and the circular arc center portions.

4. The pressure vessel according to claim 1, wherein the increased thickness portions are continuous along a center axis direction of the cylindrical shape.

5. A turbine, comprising:
a casing; and
a rotor,
wherein:
the rotor is inside the casing and is rotatable;
a cylindrical shape of the casing is divided into two parts in a radial direction of the casing, and the casing is connected in the cylindrical shape via flanges protruding outward in the radial direction of the casing at both divided ends of the casing;
increased thickness portions are defined in a portion excluding the divided ends and circular arc center portions farthest from the divided ends, the portion being between the divided ends and the circular arc center portions;
the increased thickness portions increase radial direction thickness of the portion; and
each of the increased thickness portions has: (i) a first circumferential surface facing toward the casing and being parallel to the casing; (ii) a second circumferential surface facing away from the casing and being parallel to the casing; (iii) a first side surface; and (iv) a second side surface.

* * * * *